(12) United States Patent
Branam et al.

(10) Patent No.: US 8,743,906 B2
(45) Date of Patent: Jun. 3, 2014

(54) SCALABLE SEAMLESS DIGITAL VIDEO STREAM SPLICING

(75) Inventors: Steve Branam, Ayer, MA (US); Craig Frink, Chelmsford, MA (US); Santosh Krishnan, Windham, NH (US); Weidong Xu, Westford, MA (US); Jean Zhou, Nashua, NH (US); Qin-Fan Zhu, Acton, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 100 days.

(21) Appl. No.: 12/359,254

(22) Filed: Jan. 23, 2009

(65) Prior Publication Data

US 2010/0189131 A1    Jul. 29, 2010

(51) Int. Cl.
*H04J 3/24* (2006.01)
*H04J 3/18* (2006.01)

(52) U.S. Cl.
USPC .......................................... 370/474; 370/477

(58) Field of Classification Search
USPC ................................................. 370/477, 487
See application file for complete search history.

(56) References Cited

U.S. PATENT DOCUMENTS

| | | | |
|---|---|---|---|
| 5,424,770 A | 6/1995 | Schmelzer et al. | |
| 5,534,944 A | 7/1996 | Egawa et al. | |
| 5,537,408 A | 7/1996 | Branstad et al. | |
| 5,655,117 A | 8/1997 | Goldberg et al. | |
| 5,659,539 A | 8/1997 | Porter et al. | |
| 5,805,804 A | 9/1998 | Laursen et al. | |
| 5,859,660 A | 1/1999 | Perkins et al. | |
| 5,864,682 A | 1/1999 | Porter et al. | |
| 5,878,220 A | 3/1999 | Olkin et al. | |
| 6,112,226 A | 8/2000 | Weaver et al. | |
| 6,119,154 A | 9/2000 | Weaver et al. | |
| 6,138,147 A | 10/2000 | Weaver et al. | |
| 6,154,496 A | 11/2000 | Radha ...................... | 375/240.28 |
| 6,480,539 B1 | 11/2002 | Ramaswamy ............ | 375/240.03 |
| 6,567,471 B1 | 5/2003 | Yoshinari ................ | 375/240.26 |
| 6,578,070 B1 | 6/2003 | Weaver et al. | |
| 6,678,332 B1 * | 1/2004 | Gardere et al. .......... | 375/240.26 |
| 6,792,047 B1 | 9/2004 | Bixby et al. ............. | 375/240.26 |

(Continued)

FOREIGN PATENT DOCUMENTS

| | | |
|---|---|---|
| EP | 0 755 157 A2 | 1/1997 |
| EP | 0 772 360 | 5/1997 |

(Continued)

OTHER PUBLICATIONS

Zhang, Y., et al., "Integrated Rate Control and Buffer Management for Scalable Video Streaming," *IEEE*, 248-251 (2007) (XP31123608A ICME 2007).

(Continued)

*Primary Examiner* — Mark Rinehart
*Assistant Examiner* — Angel Brockman
(74) *Attorney, Agent, or Firm* — Joshua T. Matt

(57) ABSTRACT

Described are computer-based methods and apparatuses, including computer program products, for scalable seamless digital video stream splicing. Data packets in a first video stream of bits are rearranged. Placeholder packets are created in a second video stream of bits. The first video stream of bits and the second video stream of bits are combined to generate a spliced stream by inserting data packets from the first video stream of bits into the placeholder packets in the second video stream of bits.

27 Claims, 12 Drawing Sheets

(56) References Cited

U.S. PATENT DOCUMENTS

| | | | |
|---|---|---|---|
| 6,912,251 | B1 | 6/2005 | Ward et al. .................... 375/240 |
| 6,944,585 | B1 | 9/2005 | Pawson |
| 7,058,721 | B1 | 6/2006 | Ellison et al. |
| 7,107,309 | B1 | 9/2006 | Geddes et al. |
| 7,624,416 | B1 * | 11/2009 | Vandermolen et al. ....... 725/109 |
| 2004/0160971 | A1 | 8/2004 | Krause et al. |
| 2004/0170198 | A1 | 9/2004 | Meggers et al. |
| 2004/0174908 | A1 * | 9/2004 | Le Bars et al. ................ 370/516 |
| 2004/0218093 | A1 * | 11/2004 | Radha et al. ............... 348/384.1 |
| 2005/0223107 | A1 | 10/2005 | Mine et al. |
| 2005/0256873 | A1 | 11/2005 | Walker et al. |
| 2006/0227813 | A1 | 10/2006 | Mavrogeanes |
| 2007/0055984 | A1 | 3/2007 | Schiller et al. |
| 2008/0270800 | A1 | 10/2008 | Krober et al. |
| 2009/0083811 | A1 | 3/2009 | Dolce et al. |
| 2009/0083813 | A1 | 3/2009 | Dolce et al. |
| 2009/0182790 | A1 | 7/2009 | Hluchyj et al. |
| 2009/0182843 | A1 | 7/2009 | Hluchyj et al. |
| 2009/0182939 | A1 | 7/2009 | Hluchyj et al. |
| 2009/0217318 | A1 * | 8/2009 | VerSteeg et al. ................ 725/32 |
| 2010/0011397 | A1 | 1/2010 | Baran et al. |

FOREIGN PATENT DOCUMENTS

| | | |
|---|---|---|
| EP | 1115252 A2 | 7/2001 |
| EP | 1 365 587 | 11/2003 |
| EP | 1655963 A2 | 5/2006 |
| WO | WO 01/56285 | 8/2001 |
| WO | WO 02/09425 A1 | 1/2002 |

OTHER PUBLICATIONS

Zhang, Y., et al., "Joint Rate Allocation and Buffer Management for Robust Transmission of VBR Video," *Acta Automatica Sinica*, 34(3):337-343(2008) (XP2551681A).

ITU-T Recommendation J.181: Series J: Cable Networks and Transmission of Television, Sound Programme and Other Multimedia Signals—Miscellaneous—Digital program insertion cueing message for cable television systems: 1-19 (Mar. 2001) (XP2365099A).

Wee, et al., "Splicing MPEG Video Streams in the Compressed Domain," *IEEE*: 225-230 (1997) (XP957700A).

Written Opinion of the International Searching Authority from corresponding PCT application: PCT/US2010/021788, 8 pages.

ITU-T: "Digital program insertion cueing message for cable television systems." ITU Recommendation J. 181. (Mar. 9, 2001), 26 pages.

Wee S.J. et al., "Splicing MPEG Video Streams in the Compressed Doman," IEEE Workshop on Multimedia Signal Processing, Proceedings of Signal Processing Society Workshop on Multimedia Signal Processing, (Jun. 23, 1997), pp. 225-230.

Tudor, P.N., "MPEG-2 Video Compression," *Electronics and Communication Engineering Journal*, pp. 1-12, Dec. 1995.

Hurst et al., "MPEG Splicing: Tutorial and Proposed SMPTE Standard," *SMPTE Journal*, pp. 1-14, Nov. 1998.

ISO/IEC 13818-1: ITU-T Recommendation H.222.0: Series H: Audiovisual and Multimedia Systems: Infrastructure of Audiovisual Services—Transmission Multiplexing and Synchronization; Information Technology—Generic Coding of Moving Pictures and Associated Audio Information Systems: 1-171, May 27, 1999.

ISO/IEC 13818-2: ITU-T Recommendation H.262: Series H: Audiovisual and Multimedia Systems: Infrastructure of Audiovisual Services—Coding of Moving Video Information Technology—Generic Coding of Moving Pictures and Associated Audio Information: Video: 1-220, Feb. 17, 2000.

ISO/IEC 14496-10: ITU-T Recommendation H.264: Series H: Audiovisual and Multimedia Systems: Infrastructure of Audiovisual Services—Coding of Moving Video: Advanced Video Coding for Generic Audiovisual Services: 1-343, Mar. 1, 2005.

SCTE 35 (ITU-T J.181): Digital Program Insertion Cueing Message for Cable, pp. 1-37, 2004.

U.S. Appl. No. 12/015,490, Method and Apparatus for Dynamic Transmission Rate Adjustment to Support Seamless Splicing of Compressed Video Streams, pp. 1-38, filed Jan. 16, 2008.

* cited by examiner

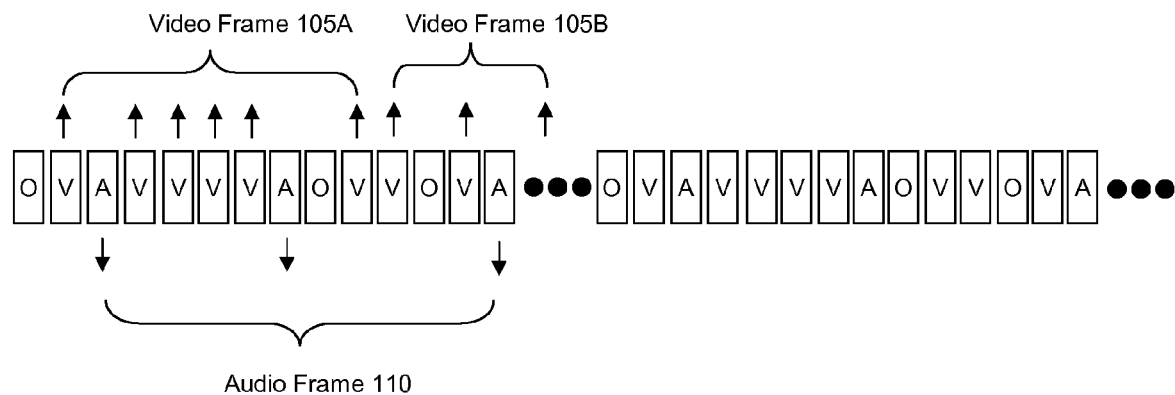
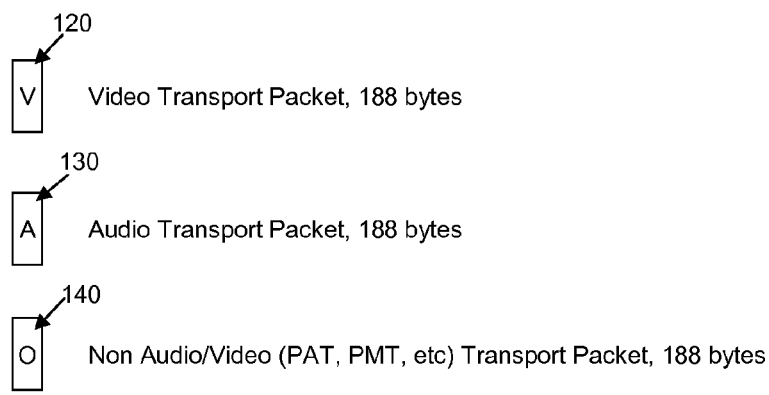
FIG. 1 (background)

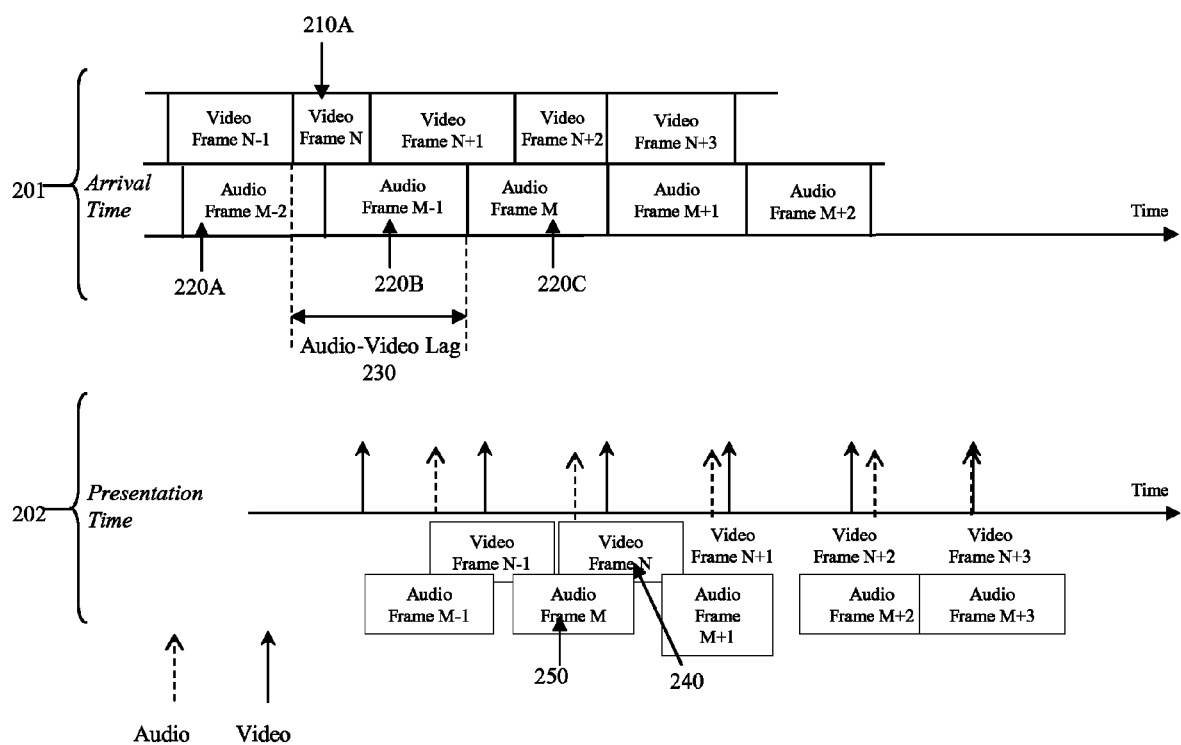
FIG. 2 (background)

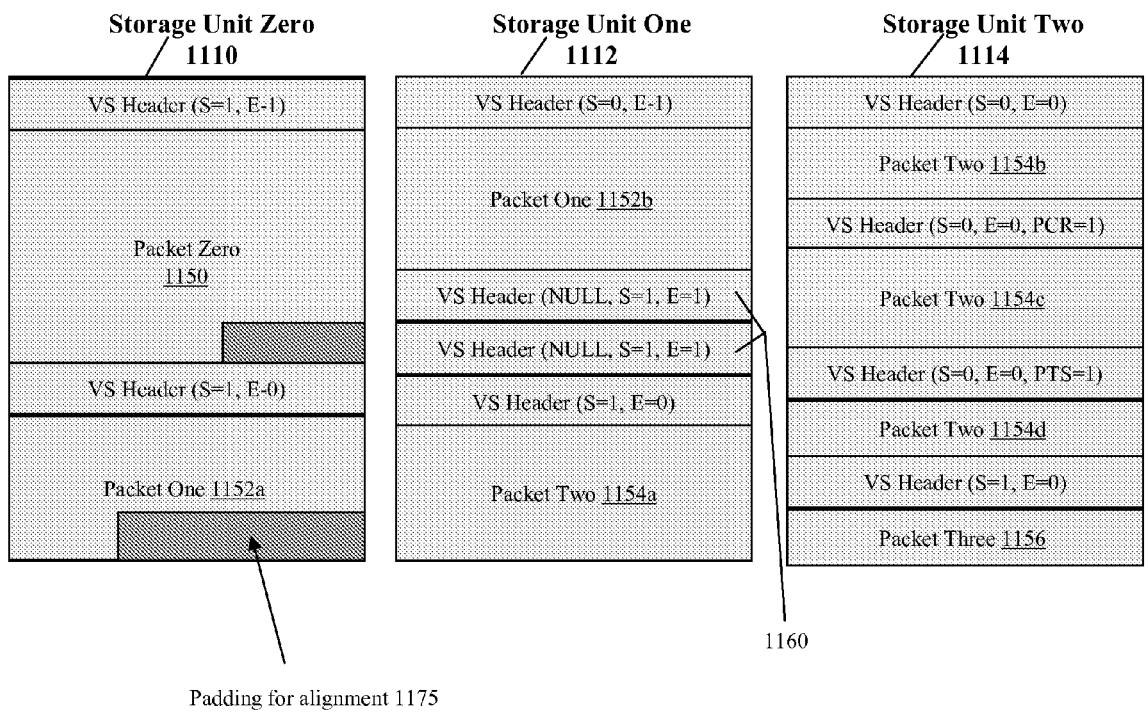
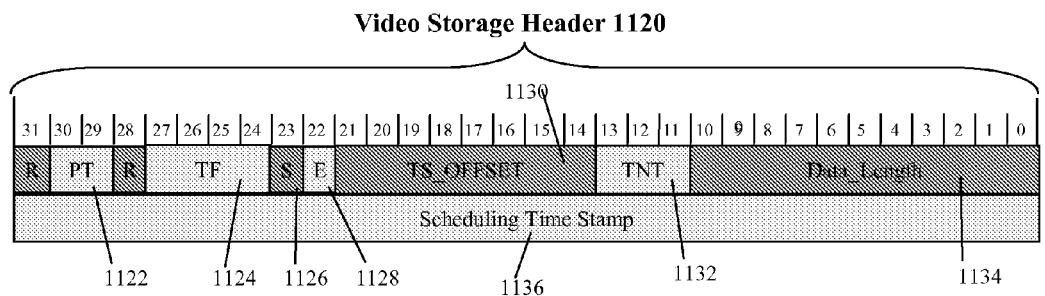
| PT (Packet Type) | TF (TS Flag) | S: Start of Packet | TNT: Total Number of TS |
|---|---|---|---|
| 00: Padding | 0000: Normal | 0: Not Start of Packet | |
| 01: Reserved | 0010: PTS | 1: Start of Packet | |
| 10: Packet | 0011: PTS+DTS | | |
| 11: NULL | 0100: PCR | E: End of Packet | R: Reserved |
| | 0110: PCR+PTS | 0: Not End of Packet | |
| | 0111: PCR+PTS+DTS | 1: End of Packet | |
FIG. 11

SCALABLE SEAMLESS DIGITAL VIDEO STREAM SPLICING

FIELD OF THE INVENTION

The present invention relates generally to computer-based methods and apparatuses, including computer program products, for scalable seamless digital video stream splicing.

BACKGROUND

Digital compressed video based on the MPEG set of standards has become the predominant choice for delivering and storing broadcast-quality digital video content. The ISO/IEC 13818 suite specifies the widely deployed MPEG-2 standard, while ISO/IEC 14496 part 10 (also known as ITU-T H.264) specifies the increasingly popular MPEG-4 AVC video coding standard which provides for a much improved coding efficiency. In general, MPEG distinguishes between the compression layer, responsible for coding the raw video and associated audio signals, and the systems layer, responsible for the carriage, synchronization and timing of multiple such compressed audio/video signals. It is common to find MPEG-4 AVC compressed video carried with the MPEG-2 systems layer. We describe this invention in terms of MPEG-2 systems constructs with the knowledge that it is equally applicable to other similarly layered digital video.

In a typical MPEG-2 encoder, the compression layer receives a periodic sequence of frames (also referred to as pictures) of uncompressed digital video, and its associated audio, along with other system information such as program information data commonly known as EPG (Electronic Program Guide). Audio and video signals are first compressed at the source coding level into elementary streams, which are then converted into packetized elementary streams (PES) where decoding and presentation timestamps are inserted for ease of system level multiplexing and presentation.

Broadly speaking, an MPEG-2 compressed video stream is generated in two stages, the first in the so called pixel domain and the next in the frequency domain. In the first stage, a technique referred to as "motion compensated prediction" is applied to the video frames in order to remove temporal redundancy across frames. Specifically, the frames get subdivided into three types, intra-coded or I frames, forward predicted or P frames, and bi-directionally predicted or B frames. An I frame is self-contained and may be decoded independently by the receiver, whereas P and B frames only contain differential information with respect to other frames. Consequently, the latter are expected to be significantly smaller in size than I frames. In the next stage, blocks of pixels of each frame are transformed into the "frequency domain" using the Discrete Cosine Transform (DCT) operation in order to remove the spatial redundancy within the frame. The result of this step is a set of DCT coefficients. To further reduce the amount of bits required to represent each frame, the DCT coefficients are quantized (by dividing each value using a pre-determined scale, with a finer-grain quantization corresponding to a higher video quality) and the quantized set is subject to a run length coding operation. The result of run-length coding along with coding modes and motion vectors is further coded with entropy coding techniques such as Huffman coding and arithmetic coding.

Separate compression layers are responsible for generating one or more corresponding audio elementary streams (e.g., one per dubbed language). In addition, a video program may also contain one or more data elementary streams, e.g., to carry program-specific information.

The MPEG-2 systems layer multiplexes several compressed elementary streams (audio, video and data), belonging to one or more video programs, into a single "transport stream" (TS), suitable for storage and network transmission of the program(s). In addition to multiplexing, the systems layer performs several roles including packetization of the compressed signals, stream synchronization and timing control, all of which are relevant to the present invention. Shown in FIG. 1, compressed audio and video frames 105A, 105B and 110, along with other data such as program association table (PAT) data and program map table (PMT) data, are carried in transport packets of fixed length, each consisting of 188 bytes (e.g., video transport packet 120, audio transport packet 130, non-audio/video transport packet 140). For each of the transport packets 120, 130 and 140, the first 4 bytes are the fixed transport header bytes. The first byte of the header is hard coded (0x47) as a synchronization byte. The other three bytes include a 13-bit packet identification (PID) field. This field is used for multiplexing different audio, video and other type of data such as PAT, PMT. The MPEG-2 standard pre-allocates some PIDs for fixed purposes. PID 0 is used for PAT. PID 8191 is used for NULL packets, which are used for padding. One of the fields in the TS header is the Payload Unit Start Indicator (PUSI), which identifies the start of a video frame (e.g., video frame 105A) or audio frame (e.g., audio frame 110). A MPEG-2 transport stream can contain multiple programs, with the PAT specifying each program's PMT PIDs. The PMT of each program will specify what PIDs are used for that program, and each PID's usage (audio, video, and others). Note that a program can contain multiple audio streams but typically only one video stream. Since there is only one NULL PID, NULL packets do not belong to any particular program but to the whole transport stream. Of course, if there is only one program contained in a bitstream, then the NULL packets can be considered to belong to that program.

The MPEG-2 encoder communicates a time-base, referred to as a Program Clock Reference (PCR), to the receiver via a field in the TS packet header. Not all TS packets carry a PCR value; however, we may assume an implicit PCR associated with each packet. A PCR value denotes the relative departure time of the packet at the sender. The systems layer assumes a constant-delay transmission network and relies on independent means to compensate for delay jitter in the network, if any. Consequently, the PCR also denotes the relative arrival time of the packet at the receiver. As MPEG-2 is primarily designed for an open-loop network, the sequence of incoming PCR values is used by the receiver to lock its clock to that of the sender, so as to maintain an identical frame period as at the input to the encoder, and thereby also to avoid buffer underflow and overflow with respect to the incoming stream. In order to control and synchronize (e.g., to maintain lip sync) the presentation time of each audio and video frame in the multiplex, the encoder communicates a Presentation Time-Stamp (PTS) with each frame. In addition, to provide for correct decoding of bi-directionally predicted frames, the systems layer at the encoder sends frames in decoding order (as opposed to presentation order), and communicates a Decode Time-Stamp (DTS) with each frame, when the DTS is different from the PTS of that frame. A compliant MPEG-2 receiver essentially receives TS packets belonging to a frame at their indicated (or implicit) PCR values and buffers them temporarily. A frame is removed from the buffer and decoded at its specified DTS value, and is presented to the viewer at its PTS value. Note that the standard assumes an idealized model where decoding time is zero, which is not true in practice.

Hence in a real world implementation, more buffering is required to compensate for the non-zero decoding time.

Due to the nature of video signals and the usage of I, P and B frame coding, the size of a compressed video frame can vary significantly. On the other hand, a typical communication channel has fixed bandwidth. In order to carry the variable sized compressed video frames over a fixed bandwidth channel, a buffer is typically used between the output of the video encoder and the input of the channel to smooth the bitrate variation. Larger frames are transmitted over a longer time interval as opposed to the smaller ones, yielding a variable frame rate of departure (and arrival at the receiver). In order to help the receiver re-construct the fixed frame rate of presentation, while maintaining an open-loop network model, the encoder maintains and controls a model of the receiver buffer, called the Video Buffering Verifier (VBV). Typically, the receiver buffer is controlled by assigning a DTS value to a frame such that the sum of the delays experienced by each frame in the sender and receiver buffers is a constant. The size of the receiver buffer is referred to as the VBV buffer size, which is communicated in the sequence header of the elementary stream, while the amount of time each frame spends in the buffer is referred to as its VBV delay, which equals the difference between the arrival time of its first bit and its DTS value. As long as a receiver adheres to the VBV delay of every frame of a sequence, the presentation can proceed at the frame rate of the original video source without danger of underflow or overflow at the receiver until the end of that sequence.

On the other hand, each audio frame is typically compressed to a constant number of bits and hence there is no need to buffer data between the encoder and the decoder. In order to achieve synchronized presentation of the audio and video, the buffering delay for audio and video are significantly different. As a result of this, the audio and video data at the same stream position have PTS values which are far apart (in the range of multiples of hundred milliseconds) as shown in FIG. 2. In the Arrival Time (which is the same as transmission time) program 201, video frame N 210A is adjacent to audio frame M−2 220A and audio frame M−1 220B. However, in the Presentation Time program 202, video frame N 240 is presented at approximately the same time as audio frame M 250. Hence in the bitstream, there is a time lag between video frame N 210A and audio frame M 220B. This time lag is referred to as the audio-video lag 230. The resulting effect is commonly referred to as the audio-video lag problem, and, as described in more detail below, this causes problems for video stream splicing. To make things worse, there are typically more than one audio streams associated with a given video stream to support multiple languages. These multiple audio streams are not necessarily aligned to each other.

Splicing refers to the back-to-back concatenation of two digital video streams in order to create a single continuous stream. The last frame of the first stream is referred to as the "out-point" frame, while the first frame of the second stream is referred to as the "in-point" frame. In terms of bits of a MPEG TS, we may refer to the last bit of the first stream as the out-point, and the first bit of the second stream as the in-point. A splice is said to be "seamless" if, for example, the resultant stream is both syntactically correct (i.e., adheres to the MPEG stream syntax in the case of compressed MPEG video) and free of audio and visual glitches. A visually seamless splicing operation ensures that the VBV buffer does not overflow or underflow, the stream does not violate the capacity of the communications channel, a fixed frame rate of presentation can be maintained in the resultant stream, and audio and video synchronization is not lost during the transition. Note that if bits are lost either due to a VBV overflow or a violation of channel capacity, such loss may result in a long lasting glitch if the affected frame(s) is referenced by other prediction-based frames. If the VBV buffer underflows, such underflow results in a "freeze-frame," wherein a single frame is presented for more than one frame period. Moreover, any underflow represents lost time, which may be critical in the case of live video streams.

A common and increasingly important application of splicing is Digital Program Insertion (DPI). FIG. 3 shows a network 300 with DPI, as illustrated in the art. The network 300 includes a network encoder 302, an ad server 304, a DPI system 306, and a decoder 308. The ad server 304 includes one or more storage devices (e.g., storage device 310 and storage device 312). The DPI system 306 includes a splicer 314. The splicer 314 can be, for example, a splicing apparatus belonging to the operator of network 300 (e.g., a regional telecommunications service provider or a cable multiple system operator (MSO)). A DPI system 306 receives a network stream 316 for distribution to its customers (e.g., through the decoder 308). The network stream 316 can be a broadcast channel. The network stream 316 includes embedded "cue messages" that indicate opportunities for the operator to insert advertisements or other local programs. In response to the cue messages, the splicer 314 sends an advertisement (ad) request 318 to the advertisement (ad) server 304 instructing it to stream an advertisement at a specified time instant. The ad request 318 contains all the necessary information (e.g., channel number, program identifier, opportunity identifier, etc.) for the ad server 304 to determine the exact video stream to serve. The ad server 304 transmits an advertisement (ad) stream 320 to the splicer 314. At the appropriate instant, the splicer 314 switches from the network stream 316 to the ad stream 320 provided by the ad server 304, and back to the network stream 316 at the end of the advertisement (e.g., the end of the ad stream 320). The spliced stream 322 is thus a back-to-back concatenation of multiple video sequences. Commercial splicers typically support several concurrent splicing operations, but do not scale very well. As the amount of customer-specific personalized video streams increases due to the increasing diversity of content and newer video applications such as time-shifted television, and due to the need to better monetize broadcast content by inserting customer-specific advertisements, there remains an unmet need in the industry for splicers that can scale (in terms of concurrent splices) in a cost-effective manner.

Splicing uncompressed digital video streams or analog video streams (e.g., NTSC, PAL) is fairly straightforward. A splicer can easily switch between the out-point frame of the first stream and the in-point frame of the second stream during the vertical blanking interval between consecutive frames. One of the most difficult problems associated with splicing compressed video streams is related to the audio-video lag problem.

FIG. 4 shows an example of a presentation sequence 400 for stream splicing which highlights the audio-video lag problem, as illustrated in the art. The presentation sequence 400 includes a stream one 410, a presentation time of stream one 420, a stream two 430, a presentation time of stream two 440, a spliced stream 450 and a presentation time of the spliced stream 460. Stream one 410 includes video frame N−1 412A, video frame N 412B, video frame N+1 412C, video frame N+2 412D, video frame N+3 412E, audio frame M−2 414A, audio frame M−1 414B, audio frame M 414C, and audio frame M+1 414D. Stream two 430 includes video frame P−1 432A, video frame P 432B, video frame P+1

432C, video frame P+2 432D, video frame P+3 432E, audio frame Q−3 434A, audio frame Q−2 434B, audio frame Q−1 434C, audio frame Q 434D, and audio frame Q+1 434E. Stream One 410 is switched out from video frame N 412B and audio frame M 414C, as they have the same approximate presentation time. Similarly Stream Two 430 is spliced in from video frame P 432B and audio frame Q 434D, as they have the same approximate presentation time. In a simple splicing operation, Stream Two 430 at the beginning of frame P 432B would just be attached to the end of Stream One 410 at the end of frame N 412B. However, due to the audio-video lag issue mentioned above, the packets from the two streams 410 and 430 have to be interleaved (470) during the transition (shown in the figure as the rectangle shaded by forward slashes), in order to maintain the relative packet arrival time for both streams 410 and 430. To make things worse, the two streams 410 and 430 will typically have different audio-video lags, and hence the spliced stream 450 will either have an audio gap or overlapped audio data if the video is made to be seamless. FIG. 4 shows the case of audio gap 480 (shown as the rectangle shaded with back slashes).

Another problem with splicing is a VBV delay mismatch. The out-point VBV delay and in-point VBV delay typically are different from each other, which can lead to either decoder buffer overflow or decoder buffer underflow. Yet another issue with splicing is the identification of in-point and out-point. Not every video frame can be an in-point and/or out-point in order to achieve seamless splicing. An in-point frame has to be a random access point, and all frames after the in-point frame, in decoding order, cannot use data before the in-point frame for prediction. An out-point frame has to be a frame such that the presentation of video will have no gap before the splicing point.

There are several different approaches in the prior art to deal with the above problems. As shown in FIG. 5, a common solution is to uncompress both streams at the splicer, concatenate in the pixel domain for video, and audio samples for audio, and compress the resultant stream. While this solution can address all of the above problems with great flexibility, it is extremely compute intensive as it involves full decode and encode operations, and does not scale in a cost-effective manner. In order to achieve splicing at a relatively large scale, streams have to be concatenated in the bitstream domain. A simple stream concatenation will cut off the audio by the audio-video lag amount in the old stream, while in the new stream, there will be no audio for the audio-video lag amount. Hence depending on the decoder's handling of such spliced streams, two audio-video presentation scenarios can happen. In one scenario, the trailing audio of the old stream will be lost, while the new stream will start with audio-only playback. In the other scenario, the trailing audio of the old stream will be played back along with the starting part of the new stream. Either scenario is not ideal in terms of audio-video quality. To solve the VBV mismatch problem, a dynamic transmission rate approach can be used to make the VBV delay match without modifying the bitstream itself. While this approach maintains the best picture, it cannot be applied in all network configurations. Another approach to solve the VBV delay mismatch issue, commonly found in high-end commercial splicers, is to perform partial decode and encode operations in the frequency domain via a technique known as "transrating." Specifically, the DCT coefficients around the splice point are retrieved and re-quantized in order to reduce the amount of bits and eliminate any potential overlap in arrival times. While less compute intensive with respect to the full-decoding/re-encoding approach, transrating remains a bottleneck in scaling a compressed video splicer if it is done for all sessions. A final approach, which is the basis of the SMPTE 312M standard, is to pre-condition the splice points from the source of the bitstream so as to prevent any possibility of arrival overlap. This approach found limited favor in the industry due to the difficulty in pre-conditioning streams so as to allow for the worst-case overlap scenario.

SUMMARY OF THE INVENTION

The techniques described herein provide methods and apparatuses for seamless splicing of compressed video streams in a highly scalable and cost-effective fashion. The described splicer apparatus applies preconditioning at a stream "conditioning and marking stage" to facilitate scalable splicing. The resulting conditioned streams are stored in storage devices or in transient buffer memory. Then streams are spliced together at a stream "playlisting and post-processing stage," where simple playlisting operation is executed, along with some relatively simple post-processing operations. Multiple streams can be generated from the same conditioned streams to achieve highly scalable splicing.

In one aspect, there is a computerized method. The method includes rearranging data packets in a first video stream of bits, creating placeholder packets in a second video stream of bits, and combining the first video stream of bits and the second video stream of bits to generate a spliced stream. The combining includes inserting data packets from the first video stream of bits into the placeholder packets in the second video stream of bits. Each of the steps of any of the computerized methods described herein can be performed by the same or different computing devices in any combination.

In another aspect, there is a computer program product. The computer program product is tangibly embodied in a machine-readable storage device. The computer program product includes instructions being operable to cause a data processing apparatus to rearrange data packets in a first video stream of bits, create placeholder packets in a second video stream of bits, and combine the first video stream of bits and the second video stream of bits to generate a spliced stream. The combining includes inserting data packets from the first video stream of bits into the placeholder packets in the second video stream of bits.

In another aspect, there is a system. The system comprises means for rearranging data packets in a first video stream of bits, means for creating placeholder packets in a second video stream of bits, and means for combining the first video stream of bits and the second video stream of bits to generate a spliced stream. The combining includes inserting data packets from the first video stream of bits into the placeholder packets in the second video stream of bits.

In another aspect, there is a computerized method. The method includes processing a first compressed video stream of bits. The processing comprises receiving a first compressed video stream of bits, extracting stream metadata from the first compressed video stream of bits, determining a splice out-point of the first compressed video stream of bits, conditioning the first compressed video stream of bits based on the stream metadata, and storing the conditioned first compressed video stream of bits in a storage device. The method also includes processing a second compressed video stream of bits. The processing comprises receiving a second compressed video stream of bits, extracting stream metadata from the second compressed video stream of bits, determining a splice in-point of the second compressed video stream of bits, conditioning the second compressed video stream of bits based on the stream metadata, and storing the conditioned second compressed video stream of bits in a storage device.

The method also includes generating a spliced stream. The generating comprises retrieving the conditioned first compressed video stream of bits from the storage device, retrieving the conditioned second compressed video stream of bits from the storage device, transmitting at least a portion of the conditioned first compressed video stream of bits with the transmission ending at the splice out-point, and transmitting immediately thereafter at least a portion of the conditioned second compressed video stream of bits with the transmission starting at the splice in-point.

In some examples, any of the aspects can include one or more of the following features. The first video stream of bits, the second video stream of bits or both can be MPEG transport streams. The generating a spliced stream can include achieving a seamless splice. The rearranging data packets in a first video stream of bits can include identifying one or more data packets located in the first video stream of bits and positioning the identified data packets consecutively within the first video stream of bits. The identifying one or more data packets can include determining a video out-point of the first video stream of bits, determining an audio out-point of the first video stream of bits, and locating audio packets between the video out-point and the audio out-point. The positioning can include locating the identified data packets immediately after the video out-point.

In other examples, determining a video out-point and determining an audio out-point are based on stream metadata from the first video stream of bits. The stream metadata can include timing information, picture type information, pull-down information, splicing cue messages, indexing information, or any combination thereof.

In some examples, the creating placeholder packets in a second video stream of bits can include determining a video in-point of the second video stream of bits, determining an audio in-point of the second video stream of bits, and inserting placeholder packets between the video in-point and the audio in-point. The determining a video in-point and the determining an audio in-point are based on stream metadata from the second video stream of bits. The inserting placeholder packets can comprise determining a number and position of placeholder packets. The number of placeholder packets can depend on the rearranged data packets.

In other examples, the first video stream of bits and the second video stream of bits can be stored in a storage device. The storage device can include a physical storage module, a transient buffer memory, or any combination thereof.

In some examples, the first video stream of bits and the second video stream of bits can be buffered in a buffer. The first video stream of bits and the second video stream of bits can be formatted into a packet storage data structure, and storing the first video stream of bits and the second video stream of bits according to the packet storage data structure. The packet storage data structure can include a packet type, a timestamp flag, a timestamp offset, a scheduling timestamp, a packet start, a packet end, a data length, and a data payload.

In other examples, a video out-point associated with the first video stream of bits can be modified to a predetermined condition and modifying a video in-point associated with the second video stream of bits to a predetermined condition. The modifying a video out-point can include modifying an ending delay associated with the video out-point wherein the ending delay is equal to or greater than a predetermined threshold. The modifying a video in-point can include modifying a starting delay associated with the video in-point wherein the starting delay is equal to or less than a predetermined threshold. The modifying a video out-point and the modifying a video-in point can include transrating, Program Clock Reference (PCR) restamping, NULL packet removing, or any combination thereof.

In some examples, the combining the first video stream of bits and the second video stream of bits can include retrieving the first video stream of bits, the second video stream of bits, or both, in response to a user request. The combining the first video stream of bits and the second video stream of bits can include changing scheduling timestamps associated with data packets in the second video stream of bits so that said scheduling timestamps are temporally continuous with scheduling timestamps associated with data packets in the first video stream of bits. The combining the first video stream of bits and the second video stream of bits can include transmitting the first video stream of bits and the second video stream of bits based on the scheduling timestamps of the packets. The first video stream, the second video stream, or both can be MPEG transport streams.

Any of the examples described herein can include one or more of the following advantages. This splicing architecture and design performs complicated stream conditioning and processing at ingest to achieve high quality splicing, while concatenating transport streams together by using a simple playlisting approach at the streaming stage. In typical application scenarios, as the number of ingested streams is much less than the number of streams delivered, this architecture can achieve high-volume video stream splicing. Hence this invention enables high volume splicing without sacrificing audio-video quality.

BRIEF DESCRIPTION OF THE DRAWINGS

The foregoing and other objects, features and advantages of the present invention, as well as the invention itself, will be more fully understood from the following description of various embodiments, when read together with the accompanying drawings.

FIG. 1 is a depiction of a video stream of bits, including video transport packets, audio transport packets, and non-audio/video transport packets, as illustrated in the prior art.

FIG. 2 is a depiction of the audio/video lag problem as illustrated in the prior art.

FIG. 11 is a depiction of an exemplary storage format for packets in a video stream of bits for scalable seamless digital video stream splicing.

DETAILED DESCRIPTION

In general overview, the described methods and apparatuses are for scalable seamless digital video stream splicing.

Figure 3:
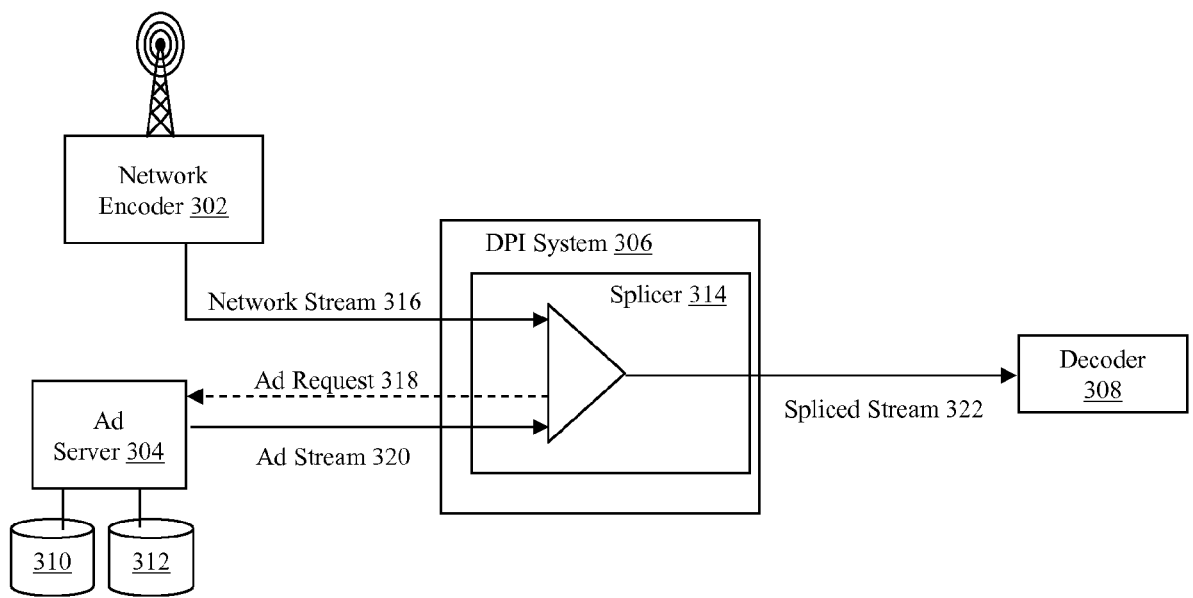
FIG. 3 is a network for digital program insertion, as illustrated in the prior art.
Figure 4:
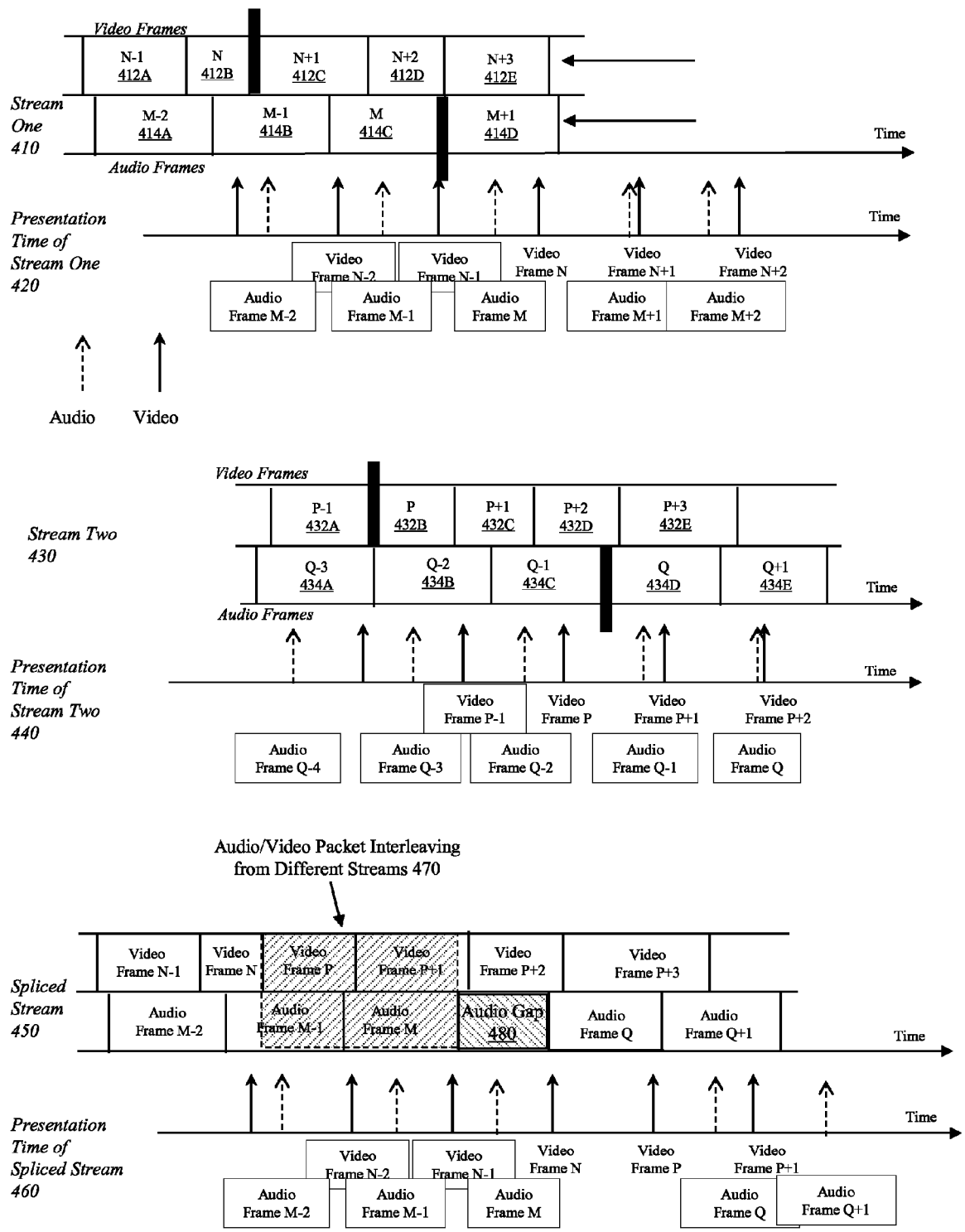
FIG. 4 is a depiction of stream splicing resulting in the audio/video lag problem as illustrated in the prior art.
Figure 5:
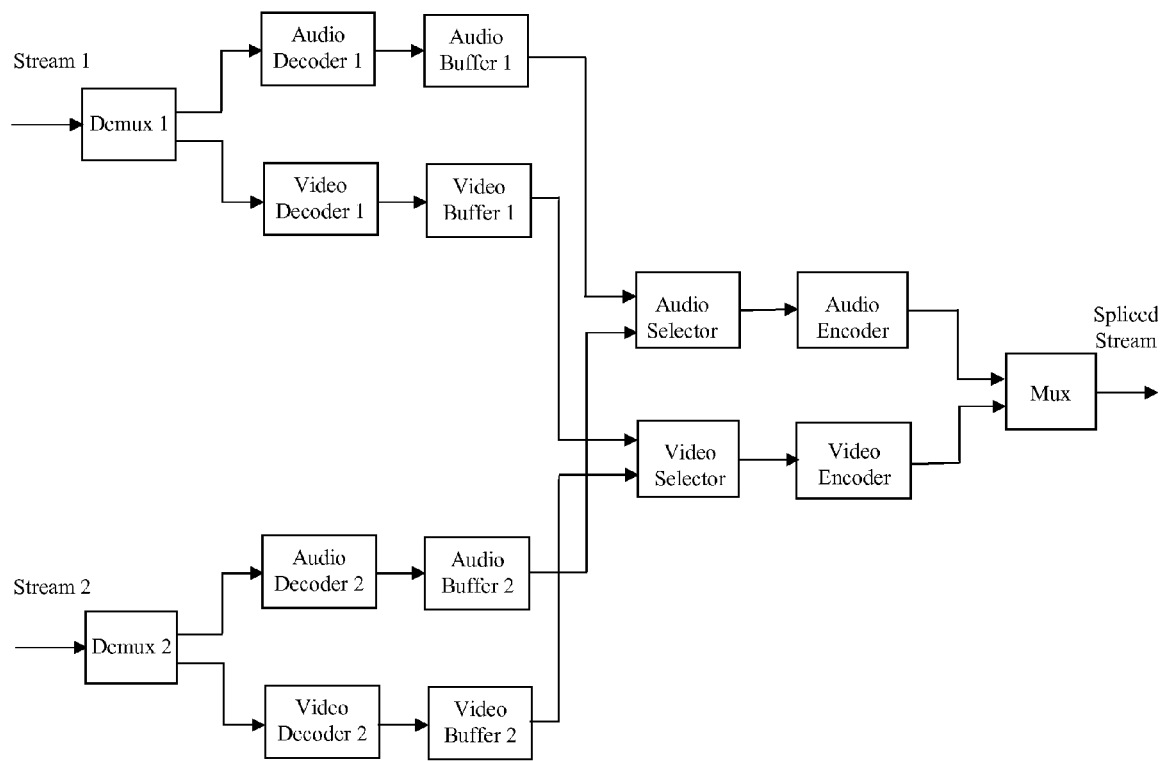
FIG. 5 is a block diagram of a system to resolve the audio/video lag problem and the Video Buffering Verifier (VBV) mismatch problem, as illustrated in the prior art.
Figure 6:
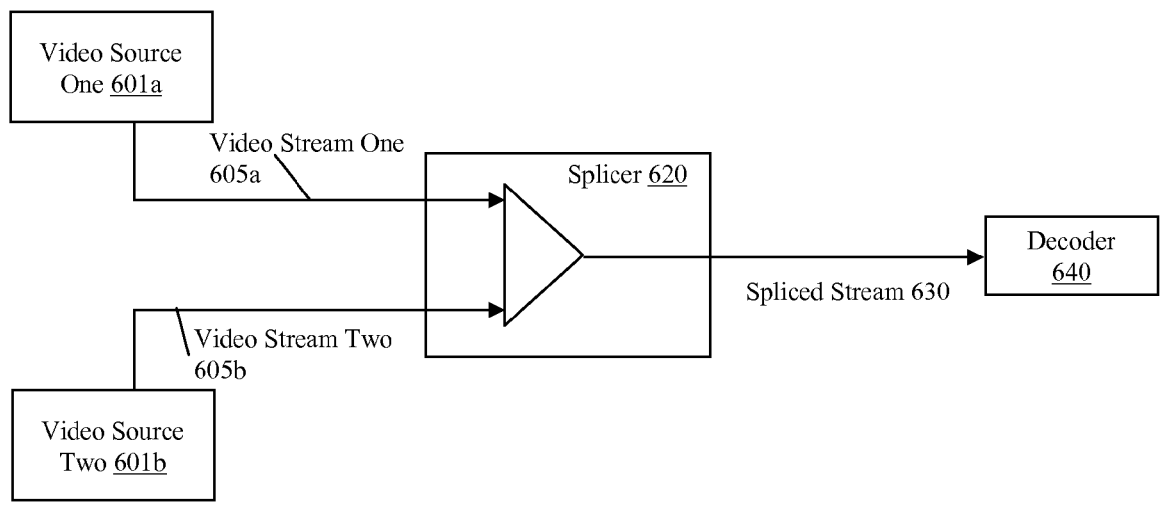
FIG. 6 is an overview diagram of an exemplary architecture for scalable seamless digital video stream splicing.

FIG. 6 is an overview diagram of an exemplary system architecture 600 for scalable seamless digital video stream splicing. In FIG. 6, the system architecture 600 consists of two video sources (e.g., Video Source One 601a and Video Source Two 601b). The video sources 601a-b are connected to the splicer 620 over a communication network (not shown) and transmit individual video streams (e.g., Video Stream One 605a and Video Stream Two 605b) to the splicer 620. After processing the streams 605a-b as described in detail below, the splicer 620 transmits a spliced stream 630 over a communication network to a decoder 640.

Figure 7:
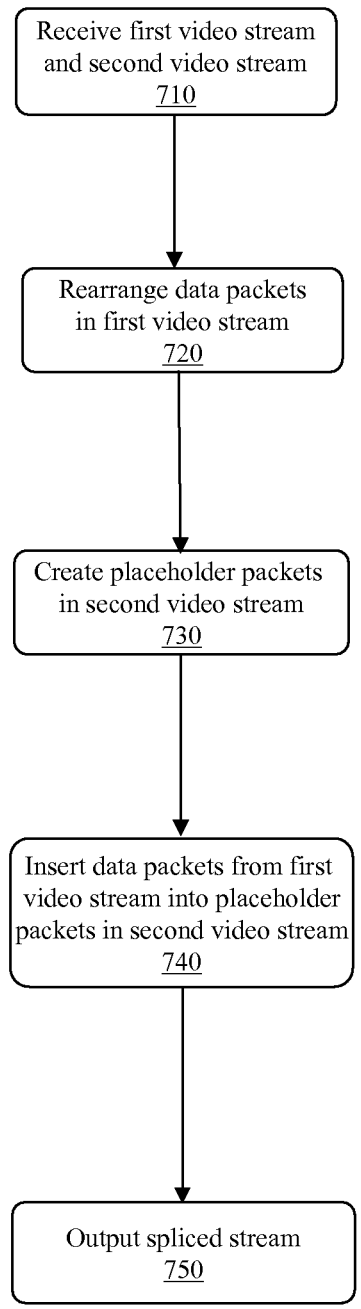
FIG. 7 is a flowchart of an exemplary method for scalable seamless digital video stream splicing.

FIG. 7 is a flowchart of an exemplary method 700 for scalable seamless digital video stream splicing. The first and second video streams 605a-b are received (710) by the splicer 620. Data packets in the first video stream 605a are rearranged (720) by the splicer 620. Placeholder packets are created (730) in the second video stream 605b by the splicer 620. The rearranged data packets from the first video stream 605a are inserted (740) into the placeholder packets in the second video stream 605b to create a spliced stream 630, which is a combination of the first video stream 605a and the second video stream 605b. The spliced stream 630 is output (750) by the splicer 620.

Figure 8:
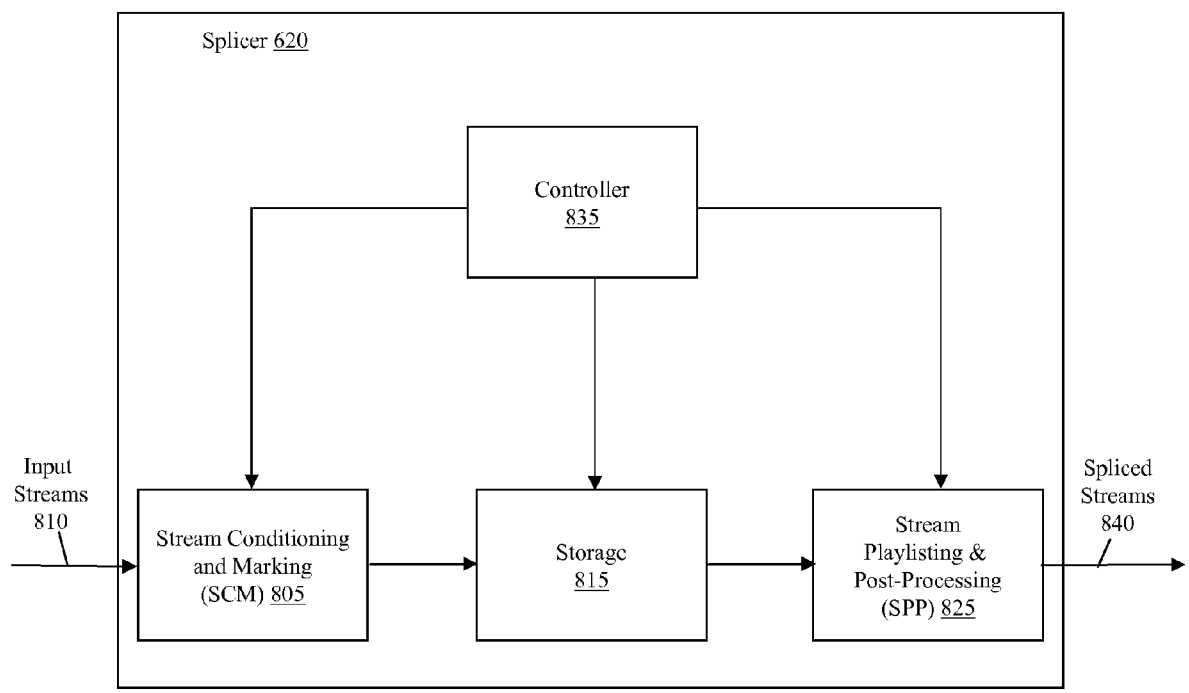
FIG. 8 is a block diagram of an exemplary system for scalable seamless digital video stream splicing.

FIG. 8 is a block diagram of an exemplary system 800 for scalable seamless digital video stream splicing. In FIG. 8, the system 800 consists of a splicer 620 containing four high-level functional blocks: the stream conditioning and marking (SCM) block 805, the storage block 815, the stream playlisting & post-processing (SPP) block 825, and the controller block 835. The SCM block 805 accepts input transport streams 810, and performs stream conditioning and marking operations. Packet headers are parsed to extract metadata including timing information (PCR/PTS/DTS, VBV delay), video and audio frame boundaries, picture coding type (I/B/P), and other picture information such as progressive/interlaced and 3-2 pull-down flags. Then audio and video in-points and out-points are identified and marked. Video in-points and video out-points are conditioned to facilitate splicing later on. One such conditioning is for handling of audio-video lag. One other conditioning is to match the VBV delay for the in-point and out-point. The output of the SCM block is fed to the storage block 815. The storage block 815 can be a volatile device like DRAM memory, or a non-volatile device such as a hard disk or flash memory. Then streams are generated in the SPP block 825 when requested by a user input or via provisioning. The controller block 835 accepts control input either from the input streams 810 by means of embedded splicing messages such as those defined in SCTE-35, or from other system components like advanced video applications software. Along with control information, the controller block 835 also receives splicing point information such as splicing position stored in the storage block 815, and timing information for the splicing points collected by the SCM block 805. The controller block 835 is responsible to instruct the SPP block 825 to start splicing at the appropriate time based on the input splicing messages.

Figure 9:
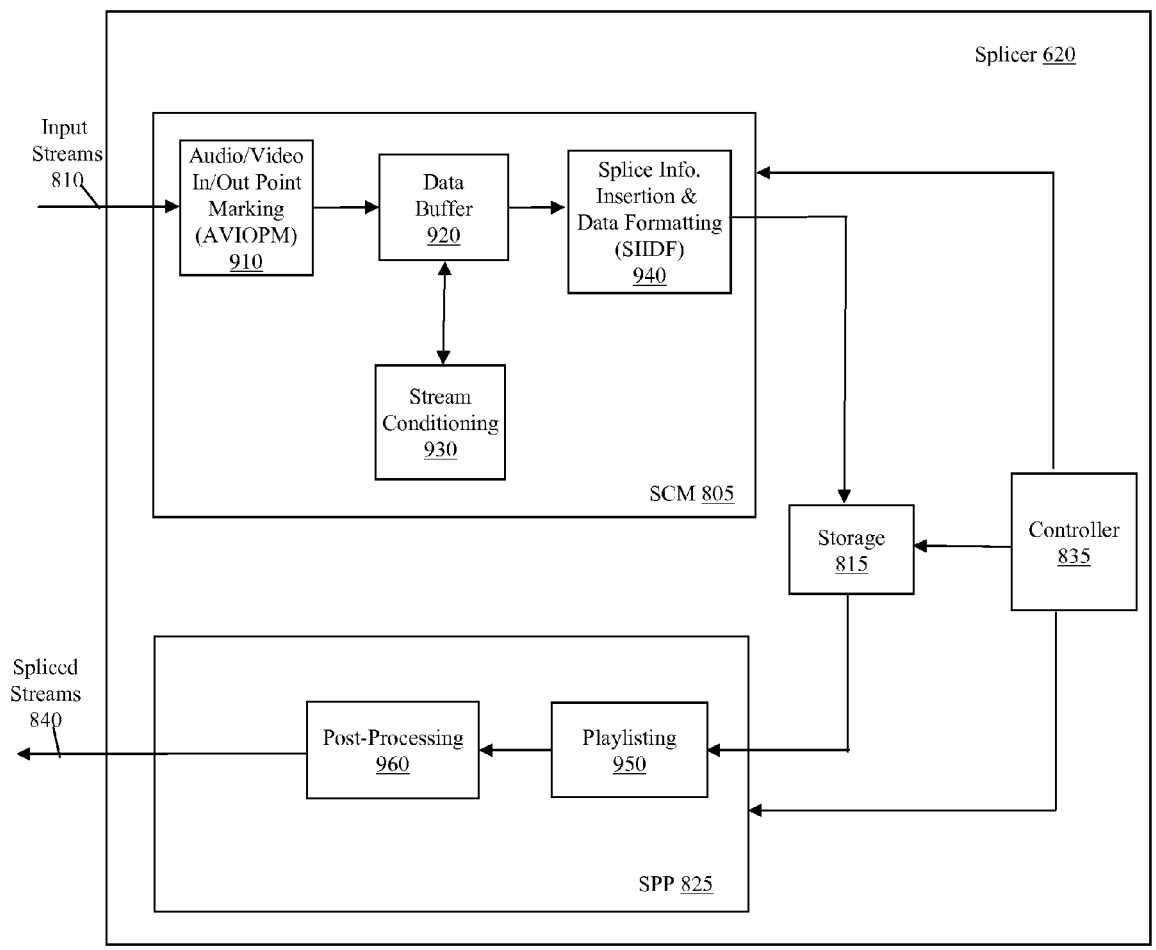
FIG. 9 is a detailed block diagram of an exemplary system for scalable seamless digital video stream splicing.

FIG. 9 is a block diagram of an exemplary system 900 for scalable seamless digital video stream splicing. FIG. 9 represents a more detailed view of the system in FIG. 8. In FIG. 9, the SCM block 805 is partitioned into four blocks: the audio/video in-point and out-point marking (AVIOPM) block 910, the data buffer block 920, the stream conditioning block 930, and the splice information insertion and data formatting (SIIDF) block 940. The AVIOPM block 910 parses the input MPEG-2 transport packet, identifying video and audio frame boundaries based on the Payload Start Unit Indicator (PUSI) bit in the TS packet header, and extracts timing and picture coding type information. It also processes splicing cue messages, such as those based on SCTE-35, marking audio and video splicing in-points and out-points. Stream conditioning is applied by the stream conditioning block 930 so that seamless splicing can take place at a later stage without complicated stream processing. The packets along with the indexing information are stored in the data buffer block 920 to facilitate the operations in the stream conditioning block 930. The SIIDF block 940 receives data from the data buffer block 920, and embeds all splicing information obtained in the AVIOPM 910 and stream conditioning 930 blocks, either into the audio-video bitstream, or in the out-of-band metadata, both to be stored into the storage block 815.

As stated above, the controller block 835 accepts control input either from the input streams 810 by means of embedded splicing messages such as those defined in SCTE-35, or from other system components like advanced video applications software. Along with control information, the controller block 835 also receives splicing point information such as splicing position stored in the storage block 815, and timing information for the splicing points collected by the SCM block 805. The controller block 835 is responsible to instruct the SPP block 825 to start splicing at the appropriate time based on the input splicing messages.

The SPP block 825 is partitioned into two blocks: the playlisting block 950 and the post-processing block 960. The playlisting block 950 fetches data from the storage block 815, based on instructions from the controller block 835. Upon receiving a splicing command from the controller block 835, the playlisting block 950 switches the content it fetches from the storage block 815. The post-processing block 960 accepts data from the playlisting block 950 and performs post-processing functions, for example as described below.

Still referring to FIG. 9, the input streams 810 are received by the SCM block 805. First, based on the PID value of each packet in the input streams 810 and the associated PMT information, each packet is classified as either a video packet, an audio packet or a data packet. For audio and video packets, the PUSI bit is used to identify the start of each packetized elementary stream (PES) packet. For video, a PES packet typically consists of only one video frame. For audio, a PES packet can contain one or more audio frames. While it is possible for a splicer device to split an audio PES with multiple audio frames and repackage into different PES alignment, in the rest of the document it is assumed that no such repacketization is required, as such operation does not affect the novel aspects of the current invention. For each audio PES packet, its PTS value and the starting packet position in the data buffer block 920 are stored in a metadata structure. For each video PES packet, in addition to PTS value and starting packet position, its DTS, PCR (or interpolated PCR), VBV delay, picture coding type (I/P/B), 3-2 pulldown, interfaced/progressive coding information are also collected and stored in a video metadata structure. The VBV delay can be obtained either from the picture header in the elementary stream, or from calculating the difference between the DTS and the PCR value of the first packet of the video frame. For pictures without a PCR value for the first packet, interpolation can be performed from surrounding PCRs, as MPEG system assumes the rate between two adjacent PCRs to be constant. For pictures without DTS but with a PTS, the PTS can be used as its DTS. This is typically the case for B pictures. The audio and video metadata structures are stored in separate circular buffers corresponding to the audio-video packets contained in the data buffer block 920 in a sliding window fashion. Packets are typically buffered in the data buffer block 920 because trailing packets may need to be conditioned after the splicing point is identified and characterized. The data buffer block 920 typically buffers data in the range, for example, of several hundred milliseconds to one second to be effective.

The splicing point information can be carried inband within the MPEG-2 stream by cue messages as defined by SCTE-35 or by other means. Independent of the means, a splicing point message typically contains the splicing time specified by a video PTS and type of splicing point (in-point or out-point). With this information, the AVIOPM block 910 compares the splicing time with the PTS of each picture as it enters the data buffer block 920. Once the difference between the entering picture's PTS and splicing time is less than or equal to a frame time, which is derived from the frame rate of the video sequence, video splicing point qualification is activated. For an out-point, the exit picture precedes an I or P picture so that there is no display gap before the out-point. For an in-point, the entry picture is a random access picture. For MPEG-2, a random access picture is an I picture. For MPEG-4 AVC, a random access picture can either be an Instantaneous Decoding Refresh (IDR) picture or I picture with some precondition. Once the video out-point is identified, then the corresponding audio out-point is found by selecting the audio PES frame whose PTS is the closest to but less than the video exit picture PTS. Once the video in-point is identified, then the corresponding audio in-point is found by selecting the audio PES frame whose PTS is the closest to but greater than the video entry picture PTS. Starting delay of video in-point and ending delay of out-point are obtained based on DTS and PCR values of the entry picture and exit picture.

Once splicing points are identified, stream conditioning is applied so that seamless splicing can take place at a later stage without complicated stream processing. There are two major stream conditioning operations. The first conditioning operation is to handle audio-video lag. The second conditioning operation is to handle VBV mismatch.

Figure 10:
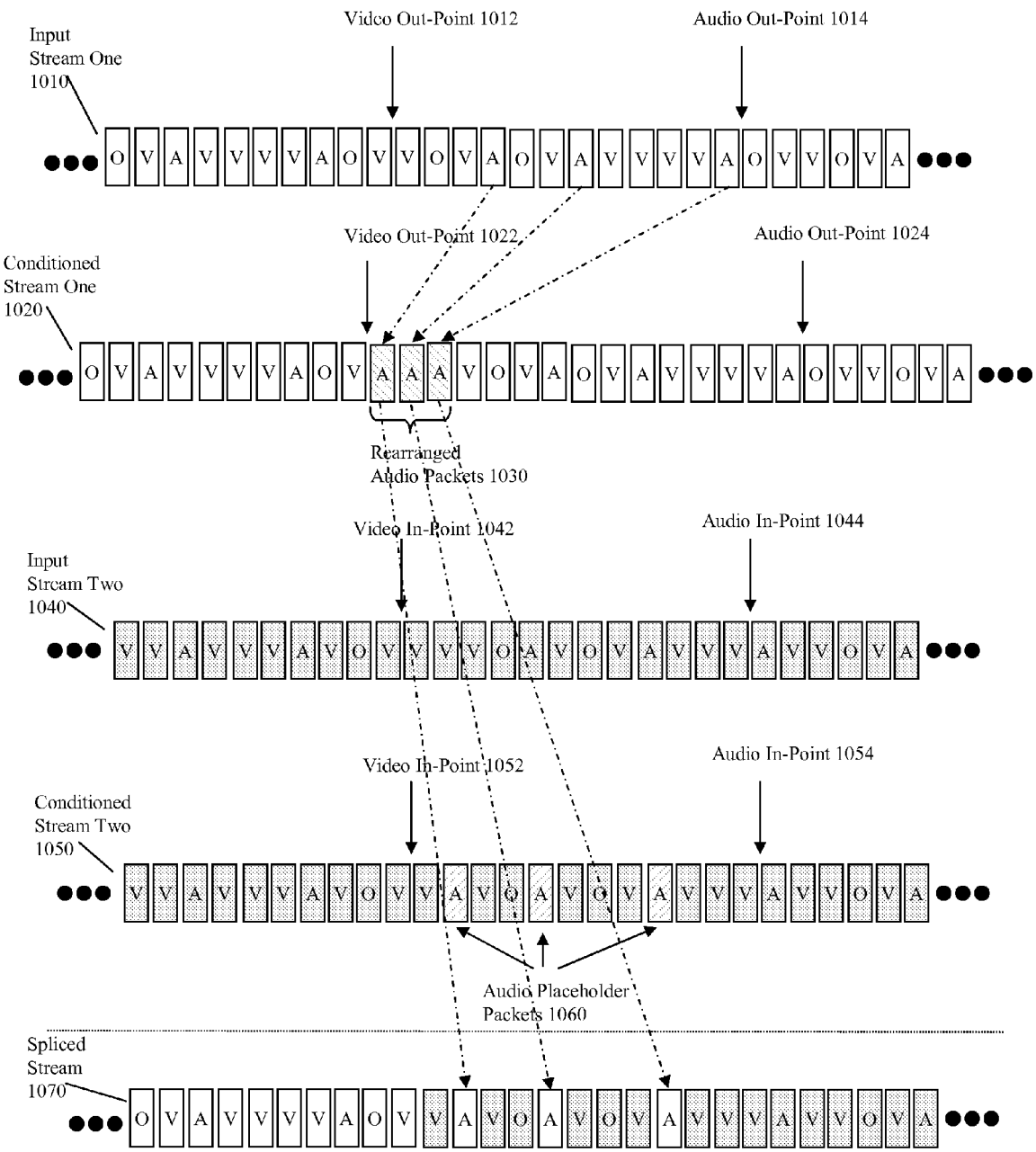
FIG. 10 is a diagram of exemplary audio packet rearrangement and placeholding for scalable seamless digital video stream splicing.

FIG. 10 is a diagram 1000 of audio packet rearrangement and placeholding for scalable seamless digital video splicing. Input Stream One 1010 is the video clip which has an out-point (represented in FIG. 10 by a video out-point (VOP) 1012 and an audio out-point (AOP) 1014). Due to audio-video lag, there are audio packets between the VOP 1012 and AOP 1014. These audio packets comprise the audio content associated with the video frames just before the VOP 1012. In order to achieve high quality audio-video splicing, these audio packets should be placed properly into the spliced streams. To ease the splicing operation, all the audio packets between the VOP 1012 and the AOP 1014 are groomed together and are placed right after the VOP 1012 (shown as shaded packets 1030 in Conditioned Stream One 1020). In some embodiments, the original audio packets may be discarded.

Input Stream Two 1040 is the video clip which has an in-point (represented in FIG. 10 by a video in-point (VIP) 1042 and an audio in-point (AIP) 1044). The audio packets between the VIP 1042 and the AIP 1044 comprise the audio content associated with the video frames before the VIP 1042, and therefore need not be included in the spliced stream 1070. On the other hand, after splicing, the rearranged audio packets of Conditioned Stream One 1020 are evenly placed into Conditioned Stream Two 1050. In order to accomplish the placing of packets into Conditioned Stream Two 1050, audio packet placeholders 1060 are inserted between the VIP 1042 and the AIP 1044 (shown as shaded packets in Conditioned Stream Two 1050). In some embodiments, the actual audio packets corresponding to the placeholders may be discarded.

The number of audio packet placeholders 1060 can be determined in two ways based on different considerations. In the first method, each audio packet between the VIP 1042 and the AIP 1044 is converted into an audio packet placeholder. In this way, the relative timing of audio, video and other packets are maintained. The drawback of this approach is that there may not be enough audio packet placeholders which can hold all rearranged audio packets of Conditioned Stream One 1020 after splicing. This problem can be solved by clipping the extra audio frames. In the second method, the number of audio packet placeholders 1060 is chosen so that it can cover the worst case scenario, which is the maximum audio bitrate multiplied by the longest time interval from the VOP 1012 to the AOP 1014. This approach will guarantee that the rearranged audio will be able to be placed into available audio packet placeholders 1060. However, this will change the relative timing and bitrate of the original bitstream. When the added audio packet placeholders 1060 are greater in number than the original audio packets from the VIP 1042 to the AIP 1044, and the bitrate of the stream has to be maintained (for example, a constant bitrate (CBR) application), video transrating is applied to squeeze the video packets so that the total packet count stays the same. While squeezing video typically involves transrating which is a complex operation, it can be absorbed into the second preconditioning operation, i.e. the VBV matching operation.

To achieve seamless splicing, the ending delay of the VOP 1012 matches the starting delay of the VIP 1042. To achieve large scale splicing, the streams 1010 and 1040 are first preconditioned so that the ending delay and starting delay are modified to a predetermined condition. In particular, the following algorithm can be applied: For the VOP 1012, if the ending delay is smaller than a predetermined threshold, then the video is transrated so that the ending delay is made to be equal to or greater than the predetermined threshold. For the VIP 1042, if the starting delay is greater than the same above-mentioned threshold, then the video is transrated so that the starting delay is made to be equal to or less than the predetermined threshold. The resulting ending delay and starting delay are also included into the splicing point information so that they can be used later in the playlisting stage.

Referring back to FIG. 9, the SIIDF block 940 receives data from the data buffer 920 and embeds all splicing information obtained in the AVIOPM 910 and stream conditioning 930 blocks, either into the audio-video bitstream, or in the out-of-band metadata, both to be stored into the storage block 815. To facilitate decoupling of memory technology and system design, the TS packets are stored in the format shown in FIG. 11. Packets are stored in fixed-length blocks (e.g., 512 bytes) called Storage Units (e.g., Storage Unit Zero 1110, Storage Unit One 1112, and Storage Unit Two 1114). Typically audio-video packets will be fetched from the storage block 815 to be sent to a subscriber through a packet network such as the Internet or private IP networks. To avoid repacketization overhead, the audio-video data are packetized by the SIIDF block 940 and the resulting packets are stored in the Storage Units 1110 through 1114. Each packet typically consists of multiple MPEG-2 188-byte transport packets. To assist storage, synchronization, error-handling and the carrying of meta information along with the stored bitstream, a Video Storage layer is added to encapsulate the media packets into storage units. A Video Storage (VS) packet consists of a Video Storage Header (VSH) 1120 and payload. The payload can be empty.

The VSH 1120 is explained in more detail in the following paragraphs. The PT (Packet Type) field 1122 specifies what is contained in the VS packet. The padding packet (identified, for example, by using 00 in the PT field 1122) is used to specify extra space where data cannot fit into the space. The NULL packet (identified, for example, by using 11 in the PT field 1122) is used to specify media packets that contain only MPEG-2 NULL transport packets and which contain no audio or video information. The TF (TS Flag) field 1124 is used to mark whether the current packet contains special MPEG-2 timestamp fields such as PTS, DTS or PCR. The presence of the TF field 1124 can ease the burden of processing at the post-processing stage when timestamps need to be restamped in order to produce a stream with a continuous timestamp across splicing boundaries. The S (Start of Packet) field 1126 is used to signal whether the current VS packet contains the start of a media packet. Similarly, the E (End of Packet) field 1128 is used to signal whether the current VS packet contains the end of a media packet. The TS_OFFSET (Timestamp Offset) field 1130 indicates the location of the timestamp field from the start of the payload field. This field 1130 eliminates re-parsing of the packet at the post-processing stage to locate the timestamp fields which need to be restamped. The TNT (Total Number of TS packets) field 1132 indicates the number of MPEG-2 TS packets contained in the current media packet. It is valid when the S field 1126 is set to one. The Data Length field 1134 is used to specify the payload length following the VS header. The Scheduling Time Stamp field 1136 is used for scheduling the media packet. This field is valid when the S field 1126 is set to one.

FIG. 11 shows a few examples of how media packets are encapsulated into VS packets. Media packet zero 1150 is contained in one VS packet (e.g., in Storage Unit Zero 1110), hence both the S field and the E field (implemented in this example as bit fields) are set in the VS header. Padding 1175 is applied at the end of the packet to make the next VS Header aligned on a word (for example, 4 bytes) boundary for ease of processing. Media packet one 1152*a-b* is contained in two VS packets (e.g., one VS packet 1152*a* in Storage Unit Zero 1110 and one VS packet 1152*b* in Storage Unit One 1112). Since the first VS packet 1152*a* only starts the media packet one without finishing, the S bit is set to 1 but the E bit is set to 0. In the second VS packet 1152*b* contained in Storage Unit One 1112, the S bit is set to 0 and the E bit is set to 1 to signal the end of media packet one. The NULL packets 1160 are shown as VS header packets without payload field. Media packet two 1154*a-d* is carried in 4 separate VS packets (e.g. one VS packet 1154*a* in Storage Unit One 1112, three VS packets 1154*b* through 1154*d* in Storage Unit Two 1114) with PCR and PTS VS headers in between.

Referring back to FIG. 8, the storage functional block 815 can be made of any combination of different kinds of digital data storage devices including hard-disk, flash and DRAM. In addition to the normal storage functionality, the storage block 815 also functions as a one-to-many fan-out functional unit. This is required typically when multiple subscribers choose to watch the same content asynchronously such as video on demand, or a personalized advertisement is sent to different subscribers even if the same source of content is watched synchronously like a live sport event broadcast. Note that in some embodiments, all complex processing operations are performed before the storage block 815. This significantly reduces the overall processing requirements, while achieving very large scale splicing.

The controller functional block 835 accepts control input either from the input streams by means of embedded splicing messages such as those defined in SCTE-35, or from other system components like advanced video applications software. Along with control information, the controller 835 also receives splicing point information such as splicing position stored in the storage block 815, and timing information for the splicing points collected by the SCM block 805. The controller 835 is responsible to instruct the SPP block 825 to start splicing at the appropriate time based on the input splicing messages.

The playlisting block 950 fetches data from the storage block 815, based on instructions from the controller 835. The playlisting block 950 keeps a local time clock which is used to schedule packets based on timestamps embedded into the VS header for each packet. Upon receiving a splicing command from the controller 835, the playlisting block 950 switches the content it fetches from storage 815. Across the splicing boundary, the scheduling timestamp typically will be discontinuous. In order to maintain VBV buffer compliance, the content is already preconditioned (as mentioned above) in the SCM block 805. In particular, the S_Delay (Starting Delay) and E_Delay (Ending Delay) should satisfy the following condition: S_Delay<=E_Delay, which implies that the first packet of the new content should be scheduled after the last packet of the old content. The packet departure time between the two packets should be equal to (E_delay−S_Delay).

The post-processing block 960 accepts data from the playlisting block 950 and performs some post processing functions. One such function is to replace the (re-arranged) lagging audio packets from the old content into the audio placer holder in the new content. Referring to FIG. 10 again, the rearranged audio packets 1030 from the old content (in this example, Conditioned Stream One 1020) are fetched from the end of Conditioned Stream One 1020 just after the VOP 1022. The audio data is fetched on a frame basis, as partial audio frame may cause audible artifacts at the decoder. Then for each fetched audio frame, if there are enough audio placeholders in the current audio frame, the audio packets for this frame are placed into the audio placeholder packets 1060 of the new content (in this example, Conditioned Stream Two 1050). The result is a spliced stream 1070 with rearranged audio packets 1030 from Conditioned Stream One 1020 inserted into placeholder packets 1060 in Conditioned Stream Two 1050. The spliced stream 1070 can then be transmitted by the SPP block 825, as shown in FIG. 9 (by the spliced streams 840 exiting the SPP block 825).

Figure 12:
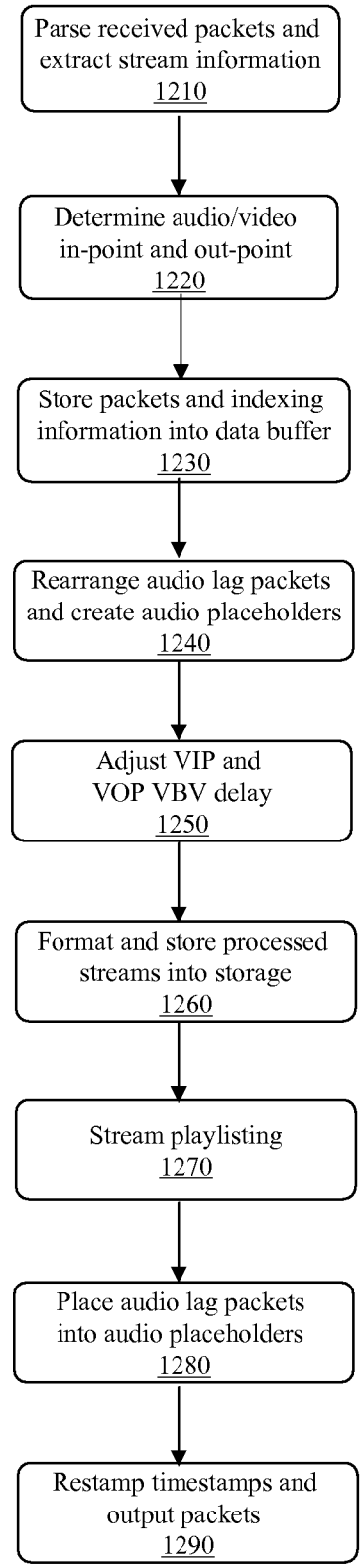
FIG. 12 is a detailed flowchart of an exemplary method for scalable seamless digital video stream splicing.

FIG. 12 is a flowchart of an exemplary method 1200 for scalable seamless digital video stream splicing. Packets from a first video stream of bits (e.g., Input Stream One 1010) and a second video stream of bits (e.g., Input Stream Two 1040) are received and parsed (1210) to extract stream information, including timing information such as PCR/PTS/DTS, picture type information such as I/P/B, and pull-down information. If there are embedded splicing cue messages, they are also extracted (1210) at this step. Then the video and audio out-points (e.g., 1012 and 1014 respectively) of the first video stream of bits and the video and audio in-points (e.g., 1042 and 1044 respectively) are determined (1220), for example, based on the cue messages. The packets along with the indexing information are stored (1230) in a data buffer to facilitate the following steps. The audio lag packets 1030, which are the audio packets between the video out-point 1012 and the audio out-point 1014 in the first video stream of bits are rearranged (1240) and placed after the video out-point 1022 to create a first conditioned stream (e.g., Conditioned Stream One 1020). In some embodiments, the audio packets 1030 are positioned immediately after the video out-point 1022. Audio placeholder packets 1060 are created (1240) between the video in-point 1042 and the audio in-point 1044 in the second video stream of bits (e.g., Input Stream Two 1040) to create a second conditioned stream (e.g., Conditioned Stream Two 1050).

Next, the VBV delay of the video out-point 1022 and the video in-point 1052 are adjusted (1250). For example, the video frames are preconditioned by using techniques such as transrating or NULL removing techniques so that the ending delay of the video out-point 1022 is greater than or equal to a predetermined threshold while the starting delay of the video in-point 1052 is less than or equal to a predetermined threshold. Then the above conditioned streams are formatted (1260), for example, according to the format shown in FIG. 11, and stored (1260) into a storage device along with indexing data.

Spliced streams are then generated by playlisting (1270) of stored streams. The lagging audio packets 1030 are placed (1280) into the audio placeholder packets 1060. Extra audio placeholder packets are either dropped or can be mapped into NULL packets. The timestamps after the splicing point can be optionally restamped (1290) to make the spliced stream have continuous timestamps. Finally packets are output (1290) based on each packet's scheduling timestamp.

The above-described systems and methods can be implemented in digital electronic circuitry, in computer hardware, firmware, and/or software. The implementation can be as a computer program product (i.e., a computer program tangibly embodied in an information carrier). The implementation can, for example, be in a machine-readable storage device for execution by, or to control the operation of, data processing apparatus. The implementation can, for example, be a programmable processor, a computer, and/or multiple computers.

A computer program can be written in any form of programming language, including compiled and/or interpreted languages, and the computer program can be deployed in any form, including as a stand-alone program or as a subroutine, element, and/or other unit suitable for use in a computing environment. A computer program can be deployed to be executed on one computer or on multiple computers at one site.

Method steps can be performed by one or more programmable processors executing a computer program to perform functions of the invention by operating on input data and generating output. Method steps can also be performed by and an apparatus can be implemented as special purpose circuitry. The circuitry can, for example, be a FPGA (field programmable gate array), an ASIC (application-specific integrated circuit), or the like. Modules, subroutines, and software agents can refer to portions of the computer program, the processor, the special circuitry, software, and/or hardware that implements that functionality.

Processors suitable for the execution of a computer program include, by way of example, both general and special purpose microprocessors, and any one or more processors of any kind of digital computer. Generally, a processor receives instructions and data from a read-only memory or a random access memory or both. The essential elements of a computer are a processor for executing instructions and one or more memory devices for storing instructions and data. Generally, a computer can include, can be operatively coupled to receive data from and/or transfer data to one or more mass storage devices for storing data (e.g., magnetic, magneto-optical disks, or optical disks).

Data transmission and instructions can also occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by and/or incorporated in special purpose logic circuitry.

To provide for interaction with a user, the above described techniques can be implemented on a computer having a display device or a transmitting device. The display device can be, for example, a cathode ray tube (CRT) and/or a liquid crystal display (LCD) monitor. The interaction with a user can be, for example, a display of information to the user and a keyboard and a pointing device (e.g., a mouse or a trackball) by which the user can provide input to the computer (e.g., interact with a user interface element). Other kinds of devices can be used to provide for interaction with a user. Other devices can be, for example, feedback provided to the user in any form of sensory feedback (e.g., visual feedback, auditory feedback, or tactile feedback). Input from the user can be, for example, received in any form, including acoustic, speech, and/or tactile input.

The computing device can include, for example, a computer, a computer with a browser device, a telephone, an IP phone, a mobile device (e.g., cellular phone, personal digital assistant (PDA) device, laptop computer, electronic mail device), a server, a rack with one or more processing cards, special purpose circuitry, and/or other communication devices. The browser device includes, for example, a computer (e.g., desktop computer, laptop computer) with a World Wide Web browser (e.g., Microsoft® Internet Explorer available from Microsoft® Corporation, Mozilla® Firefox available from Mozilla® Corporation). The mobile computing device includes, for example, a Blackberry®.

The web servers can be, for example, a computer with a server module (e.g., Microsoft® Internet Information Services available from Microsoft® Corporation, Apache Web Server available from Apache Software Foundation, Apache Tomcat Web Server available from Apache Software Foundation).

The databases can be, for example, a computer with a server module (e.g., Microsoft® SQL Server 2008 available from Microsoft® Corporation and/or Oracle® Database 11g available from Oracle® Corporation).

The above described techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computer having a graphical user interface, a Web browser through which a user can interact with an example implementation, and/or other graphical user interfaces for a transmitting device. The components of the system can be interconnected by any form or medium of digital data communication (e.g., a communication network).

The system can include clients and servers. A client and a server are generally remote from each other and typically interact through a communication network. The relationship of client and server arises by virtue of computer programs running on the respective computers and having a client-server relationship to each other.

The above described communications networks can be implemented in a packet-based network, a circuit-based network, and/or a combination of a packet-based network and a circuit-based network. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks can include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

Comprise, include, and/or plural forms of each are open ended and include the listed parts and can include additional parts that are not listed. And/or is open ended and includes one or more of the listed parts and combinations of the listed parts.

One skilled in the art will realize the invention may be embodied in other specific forms without departing from the spirit or essential characteristics thereof The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A computerized method for splicing at a splicer, a first video stream of bits and a plurality of additional video streams of bits, the method comprising:
   Rearranging data packets in the first video stream of bits;
   Creating placeholder packets in a second video stream of bits, each placeholder packet including the location of the placeholder packet in the second video stream of bits and including a packet identification field having a value distinct from that defined for null packets in a format used by the second video stream of bits;
   creating placeholder packets in a third video stream of bits, each placeholder packet including location the placeholder packet in the third video stream of bits and including a packet identification field with a value distinct from that defined for null packets in a format used by the third video stream of bits; and
   In response to a splicing command, inserting a rearranged data packet from the first video stream of bits into (i) a placeholder packet in the second video stream of bits to generate a first spliced stream and (ii) a placeholder packet in the third video stream of bits to generate a second spliced stream.

2. The method of claim 1, wherein the rearranging comprises:
   identifying one or more data packets located in the first video stream of bits; and
   positioning the identified data packets consecutively within the first video stream of bits.

3. The method of claim 2, wherein the identifying comprises:
   determining a video out-point of the first video stream of bits;
   determining an audio out-point of the first video stream of bits; and
   locating the identified data packets between the video out-point and the audio-out point.

4. The method of claim 3, wherein the determining the video out-point and the determining the audio out-point are based on stream metadata from the first video stream of bits.

5. The method of claim 4, wherein the stream metadata comprises timing information, picture type information, pull-down information, splicing cue messages, indexing information, or any combination thereof.

6. The method of claim 2, wherein the positioning comprises locating the identified data packets immediately after the video out-point.

7. The method of claim 1, wherein the creating placeholder packets in a second video stream of bits comprises:
   determining a video in-point of the second video stream of bits;
   determining an audio in-point of the second video stream of bits; and
   inserting placeholder packets between the video in-point and the audio in-point.

8. The method of claim 7, wherein the determining the video in-point and the determining the audio in-point are based on stream metadata from the second video stream of bits.

9. The method of claim 7, wherein the inserting placeholder packets comprises determining a number and position of placeholder packets.

10. The method of claim 9, wherein the number of placeholder packets depends on the rearranged data packets.

11. The method of claim 1, further comprising storing the rearranged first video stream of bits, the second video stream of bits with placeholder packets, and the third video stream of bits with placeholder packets in one or more storage devices.

12. The method of claim 11, wherein the one or more storage devices comprise a physical storage module, a transient buffer memory, or any combination thereof.

13. The method of claim 1, further comprising buffering the first video stream of bits, the second video stream of bits, and the third video stream of bits in a buffer.

14. The method of claim 1, further comprising:
   formatting the first video stream of bits, the second video stream of bits, and the third video stream of bits into a packet storage data structure; and
   storing the first video stream of bits, the second video stream of bits, and the third video stream of bits according to the packet storage data structure.

15. The method of claim 14, wherein the packet storage structure includes a packet type, a timestamp flag, a timestamp offset, a scheduling timestamp, a packet start, a packet end, a data length, and a data payload.

16. The method of claim 1, further comprising:
   modifying a video out-point associated with the first video stream of bits to a predetermined condition;
   modifying a video in-point associated with the second video stream of bits to a predetermined condition; and
   modifying a video in-point associated with the third video stream of bits to a predetermined condition.

17. The method of claim 16, wherein the modifying the video out-point comprises modifying an ending delay associated with the video out-point wherein the ending delay is equal to or greater than a predetermined threshold.

18. The method of claim 16, wherein the modifying the a video in-point comprises modifying a starting delay associated with the video in-point wherein the starting delay is equal to or less than a predetermined threshold.

19. The method of claim 16, wherein the modifying the video out-point, the modifying the video in-point, or both, includes transrating, Program Clock Reference (PCR) restamping, NULL packet removing, or any combination thereof.

20. The method of claim 1, further comprising retrieving, in response to the splicing command, at least one of: the first video stream of bits, the second video stream of bits, or the third video stream of bits.

21. The method of claim 1, further comprising changing scheduling timestamps associated with data packets in the second video stream of bits, the third video stream of bits, or both so that said scheduling timestamps are temporally continuous with scheduling timestamps associated with data packets in the first video stream of bits.

22. The method of claim 21, further comprising:
transmitting the first video stream of bits, the second video stream of bits, and the third video stream of bits based on the scheduling timestamps of the packets associated with each of the video streams of bits.

23. The method of claim 1, wherein at least one of the first video stream of bits, the second video stream of bits, or the third video stream of bits is an MPEG transport stream.

24. The method of claim 1, wherein the rearranging comprises:
identifying one or more data packets located in the first video stream of bits; and
positioning the identified data packets within the first video stream of bits.

25. A computer program product, tangibly embodied in a machine-readable storage device, for splicing at a splicer, a first video stream of bits and a plurality of additional video streams of bits, the computer program product including instructions operable to cause a data processing apparatus in communication with a splicer to:
rearrange data packets in the first video stream of bits;
create placeholder packets in a second video stream of bits, each placeholder packet including the location of the placeholder packet in the second video stream of bits and including a packet identification field having a value distinct from that defined for null packets in a format used by the second video stream of bits;
create placeholder packets in a third video stream of bits, each placeholder packet including location the placeholder packet in the third video stream of bits and including a packet identification field with a value distinct from that defined for null packets in a format used by the third video stream of bits; and
in response to a splicing command, inserting a rearranged data packet from the first video stream of bits into (i) a placeholder packet in the second video stream of bits to generate a first spliced stream and (ii) a placeholder packet in the third video stream of bits to generate a second spliced stream.

26. A video stream splicer comprising:
means for rearranging data packets in the first video stream of bits;
means for creating placeholder packets in a second video stream of bits, each placeholder packet including the location of the placeholder packet in the second video stream of bits and including a packet identification field having a value distinct from that defined for null packets in a format used by the second video stream of bits;
means for creating placeholder packets in a third video stream of bits, each placeholder packet including location the placeholder packet in the third video stream of bits and including a packet identification field with a value distinct from that defined for null packets in a format used by the third video stream of bits;
means for storing at least one of the first video stream of bits, the second video stream of bits, or the third video stream of bits in a storage device; and means for inserting, in response to a splicing command, a rearranged data packet from the first video stream of bits into (i) a placeholder packet in the second video stream of bits to generate a first spliced stream and (ii) a placeholder packet in the third video stream of bits to generate a second spliced stream.

27. A method for splicing a first compressed video stream of bits and a plurality of additional compressed video streams of bits, the method comprising:
receiving the first compressed video stream of bits;
extracting stream metadata from the first compressed stream of bits;
determining a splice out-point of the first compressed video stream of bits based on the stream metadata;
rearranging data packets in the first compressed video stream of bits based on the stream metadata;
storing the rearranged first compressed video stream of bits in a storage device;
receiving a second compressed video stream of bits;
extracting stream metadata from the second compressed video stream of bits;
determining a splice in-point of the second compressed video stream of bits based on the stream metadata extracted from the second compressed video stream of bits;
creating placeholder packets in the second compressed video stream of bits, each placeholder packet including the location of the placeholder packet in the second compressed video stream of bits and including a packet identification field having a value distinct from that defined for null packets in a format used by the second compressed video stream of bits;
storing the second compressed video stream of bits in a storage device;
receiving a third compressed video stream of bits;
extracting stream metadata from the third compressed video stream of bits;
determining a splice in-point of the third compressed video stream of bits based on the stream metadata extracted from the third compressed video stream of bits;
creating placeholder packets in the third compressed video stream of bits, each placeholder packet including the location of the placeholder packet in the third compressed video stream of bits and including a packet identification field having a value distinct from that defined for null packets in a format used by the third compressed video stream of bits;
storing the third compressed video stream of bits in a storage device;
retrieving the first compressed video stream of bits from the storage device;
retrieving at least one of the second compressed video stream of bits or the third compressed video stream of bits from the storage device;
transmitting at least a portion of the first compressed video stream of bits, the transmission ending at the splice out-point; and
transmitting immediately thereafter at least a portion of at least one of the second compressed video stream of bits or the third compressed video stream of bits, the transmission starting at the splice in-point.

* * * * *